UNITED STATES PATENT OFFICE.

GUSTAV WEDEKIND, OF PHILADELPHIA, PENNSYLVANIA.

IMPROVEMENT IN THE PREPARATION OF TRANSPARENT PICTURES.

Specification forming part of Letters Patent No. 30,649, dated November 13, 1860.

*To all whom it may concern:*

Be it known that I, GUSTAV WEDEKIND, of the city and county of Philadelphia, and State of Pennsylvania, have invented certain new and useful improvements in ornamenting glass, mica, or paper, and preserving the same against injury or decay, said glass, mica, or paper being designed for gas-burner or lamp shades, night-screens, lanterns, or other similar use; and I do hereby declare that the following is a full, clear, and exact description of the same.

The nature of my invention consists in the application and use, in connection with the lithographic colors printed or transferred upon glass, mica, porcelain, enamel, or other similar mineral or vitrified substance, or to be seen through such substances, or upon transparent paper suitably prepared to receive and display such prints or colors, of a composition of mastic and a solution of silicate of soda or potassa as a protecting coating or covering for such printed colors, as will be explained.

To enable others skilled in the art to make and use my invention, I will proceed to describe the same as I have practiced it and found it to answer well in practice.

When the pictures are made upon mica I first spread upon the mica sheets the material known as "blanc fix" with a solution of silicate of soda or potassa to produce a transparent pale milk-like color and to protect the picture that is to be transferred upon it. By exposing the mica sheet thus prepared to heat an enamel is formed, upon which the lithographic picture is struck or impressed. Next I prepare a composition of the following ingredients, and in about the proportions named, as a coating for the picture, viz: mastic, about forty-four grams; Venice turpentine, about one hundred and thirty-two grams; spirits of turpentine, about three hundred and eight grams. This mixture is then spread over the picture, and when dry a coating of the solution of the silicate of soda or potassa is placed over the mastic mixture, which completely protects the pictures from heat, moisture, or decay. When the mica is to be used over gas or lamps, or in night-screens, lanterns, &c., where only a certain degree of transparency is required, the lithographic picture may be struck upon thin tissue-paper, and affixed to the mica by the above mastic composition and protected by a coating of the solution of the silicate above named. This partially obscures the brightness of the light and makes such pictures highly useful and ornamental in gas-shades, night-screens, lanterns, &c.

When glass is used instead of mica the same process of coating with the silicate of soda or potassa is observed, and the glass plate thus prepared is exposed to high heat; but instead of printing upon the glass from the lithograph, as in the case of mica sheets, the picture is struck upon thin tissue-paper and then affixed to the glass by the above-described mastic compound and upon the enamelled side of the glass, the enamel being formed by the silicate solution, and the tissue may then be coated with the silicate solution, which protects it from injury. When a higher transparency is desirable, more than the thin tissue-paper in an unprepared state would give, it may be made more transparent by a solution of isinglass as it is found in the market; or the picture may be transferred onto the mastic preparation by its being pressed or burnished thereon, and then by wetting the paper it may be washed off, leaving the picture upon the enamel and coating it with the silicate solution; and the pictures may in this same manner be transferred onto the mica sheets; but in all cases I propose to use lithographic pictures, or pictures made of what are known as "lithographic colors," as other colors will not stand the heat that gas or lamp shades are subject to. Such colors protected by the silicate solution will stand the heat, and may be washed or cleaned without danger. The silicate may have the strength of from 33° to 60° Baumé.

Having thus fully set forth the manner in which I ornament with lithographic pictures and preserve or protect the same against heat, moisture, &c., when affixed on glass, mica, &c., what I claim as my invention is—

Affixing and preserving lithographic pictures upon glass, mica, or other similar transparent substances to be used for gas or lamp shades, screens, &c., by means of a mastic composition and a solution of silicate of soda or potassa prepared and used as herein set forth and described.

G. WEDEKIND.

Witnesses:
A. B. STOUGHTON,
I. HIRSCH.